United States Patent [19]
Shinohara et al.

[11] Patent Number: 5,682,563
[45] Date of Patent: Oct. 28, 1997

[54] CAMERA WHICH DISPLAYS INFORMATION TO A USER CORRESPONDING TO A MESSAGE IMPRINTED ON FILM

[75] Inventors: Junichi Shinohara, Yokohama; Yoshimi Ohno; Takashi Hongou, both of Kawasaki; Hiroshi Takeda, Funabashi; Keiji Himuro, Yokohama; Tatsutoshi Kitajima, Kodaira; Atsushi Satoh, Kawasaki, all of Japan

[73] Assignee: Ricoh Company, Ltd., Tokyo, Japan

[21] Appl. No.: 604,251

[22] Filed: Feb. 21, 1996

[30] Foreign Application Priority Data

Feb. 21, 1995 [JP] Japan .................................. 7-055233

[51] Int. Cl.$^6$ .................................................. G03B 17/18
[52] U.S. Cl. .................... 396/287; 396/292; 396/310
[58] Field of Search ................................. 396/287, 292, 396/310

[56] References Cited

U.S. PATENT DOCUMENTS

| | | |
|---|---|---|
| 4,888,610 | 12/1989 | Tsujimoto et al. .................. 354/106 |
| 5,023,637 | 6/1991 | Lorton et al. ...................... 354/106 |
| 5,150,143 | 9/1992 | Ohno et al. . |
| 5,543,885 | 8/1996 | Yamano et al. ..................... 354/400 |
| 5,548,361 | 8/1996 | Soshi et al. ....................... 354/105 |

*Primary Examiner*—Russell E. Adams
*Attorney, Agent, or Firm*—Oblon, Spivak, McClelland, Maier & Neustadt, P.C.

[57] ABSTRACT

A camera which imprints alphanumeric messages on the film. The camera allows a user to view, in the order of most frequently used, the messages which can be imprinted. In order to reduce the cost of the camera, there is a dot matrix LCD display which can only display a limited number of characters which is less than the total number of characters of the largest message. After a user takes a picture, the dot matrix display scrolls through the message which has been imprinted on the film so that the user can confirm that the correct message has been imprinted. The speed at which the characters are scrolled or displayed is determined based on the total number of characters of the message. As an alternative to scrolling, the characters can be displayed one or two at a time. As an alternative, instead of displaying the alpha-numerical characters of the message, a graphical indication is given that some type of information has been imprinted on the film. The duration at which this confirmation of message imprinting is displayed or scrolled corresponds to the length of the message in order to give the user some indication of the message.

54 Claims, 14 Drawing Sheets

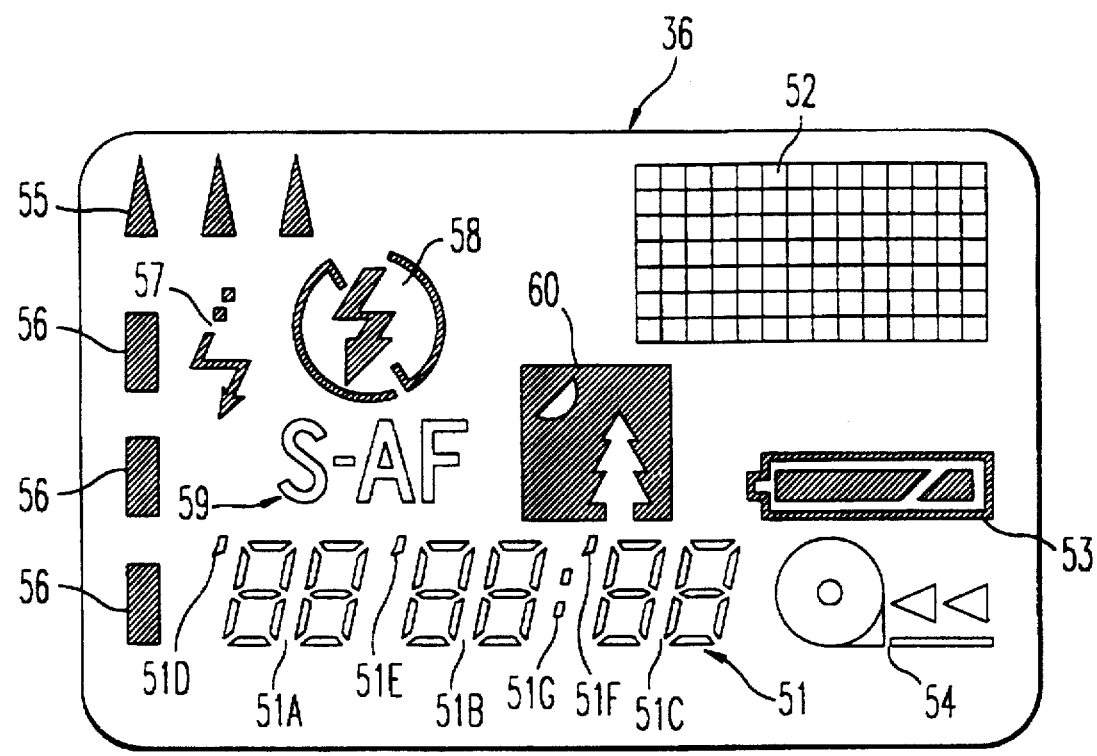
*FIG. 2*
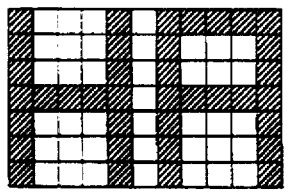 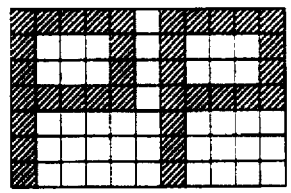 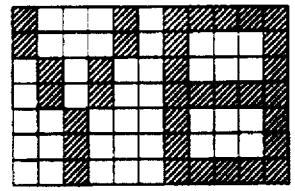
*FIG. 9A*　　　*FIG. 9B*　　　*FIG. 9C*

CAMERA WHICH DISPLAYS INFORMATION TO A USER CORRESPONDING TO A MESSAGE IMPRINTED ON FILM

BACKGROUND OF THE INVENTION

1. Field of the Invention

The present invention relates to a camera which displays information to a user indicating that a message has been imprinted on the recording medium. The invention further relates to the scrolling on a display of the message which has been imprinted on film. The invention also relates to the manner of selecting a message which is to be imprinted.

2. Discussion of the Background

The function of imprinting a date on film by a camera simultaneous to or after an exposure has been taken is well known. The camera usually includes a small display indicating the date which will be imprinted on the film. If desired, the user can disable the date printing function.

The present inventors have noticed that the date printing function is quite limited and have realized that a user might desire to imprint alphanumeric information on the film other than the date. However, by increasing the capabilities of the type of information which is imprinted on the film, further expenses will be incurred relating to the need to increase the display on the camera which shows to the user the imprinted message, the storage of messages within the camera, and the manner in which the messages to be imprinted are selected by a user. The present invention is intended to solve these problems.

SUMMARY OF THE INVENTION

Accordingly, it is an object of the invention to provide a manner of controlling a camera which imprints messages on the film.

It is a further object of the invention to provide a camera which displays messages to a user which has an inexpensive display.

It is yet another object of the invention to allow a user of the camera to easily select from various messages the message to be imprinted on the film.

It is still another object of the invention to display, on a small display which cannot simultaneously display all characters of the message, a message indicating the information which has been printed on the film.

It is a further object of the invention to provide the user with a visual confirmation that some type of message has been imprinted on the film.

These and other objects are accomplished utilizing a camera which allows a user to select a message which is to be imprinted on the film. Preferably, messages are displayed to the user in a sequence from most frequently utilized message to least frequently utilized message. By pressing a message display button, the most frequently utilized message is scrolled to the user. If the message display button is not pressed again, the last message displayed to the user is selected for imprinting on the film. If the user presses the message display button again, the next most frequently imprinted message is scrolled to the user. As an alternative to this message selection method, the user may press one button which displays only two characters of the message. If the user then presses the scroll button, the entire message is scrolled to the user. If the user presses the message display button again, the first two characters of the next message are displayed.

As a further embodiment, the camera contains three sets of message portions. The user can select any message portion from each of the three message portions in order to create a wide variety of semi-personalized messages which are displayed. For example, the second message portion can contain words such as "MOTHER'S" or "FATHER'S." Therefore, the user can easily select messages such as "MY MOTHER'S BIRTHDAY" or "MY FATHER'S BIRTHDAY" simply by altering the middle word of the message.

The present invention also allows confirmation to a user of a message which has been imprinted on the film. In order to reduce the cost of the camera, a small dot matrix LCD display is utilized and located on an exterior portion of the camera and displays between one and three characters, for example. After the exposure of the film, a message is scrolled to the user at a speed which depends on the length of the message. The scrolling rate also depends on the total time in which the message must be scrolled, the width of the display and the width of the characters, and the start and end positions of the scrolling information. Alternatively, instead of scrolling, the characters can be displayed one or two at a time.

As an alternative to actually displaying the message which has been imprinted to a user, the camera can incorporate a simple graphical indication which is flashed, scrolled, or modified in some manner which indicates that a message has been imprinted on the film. The duration of the scrolling or flashing of the display can be utilized to indicate the length of the message which has been imprinted on the film. However, in this embodiment, the actual contents of the message are not displayed to the user after the message is imprinted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates the details of the LCD display 36 on the exterior of the camera;

FIGS. 9A–9C illustrate the display of two characters at a time;

DESCRIPTION OF THE PREFERRED EMBODIMENTS

Figure 1A:
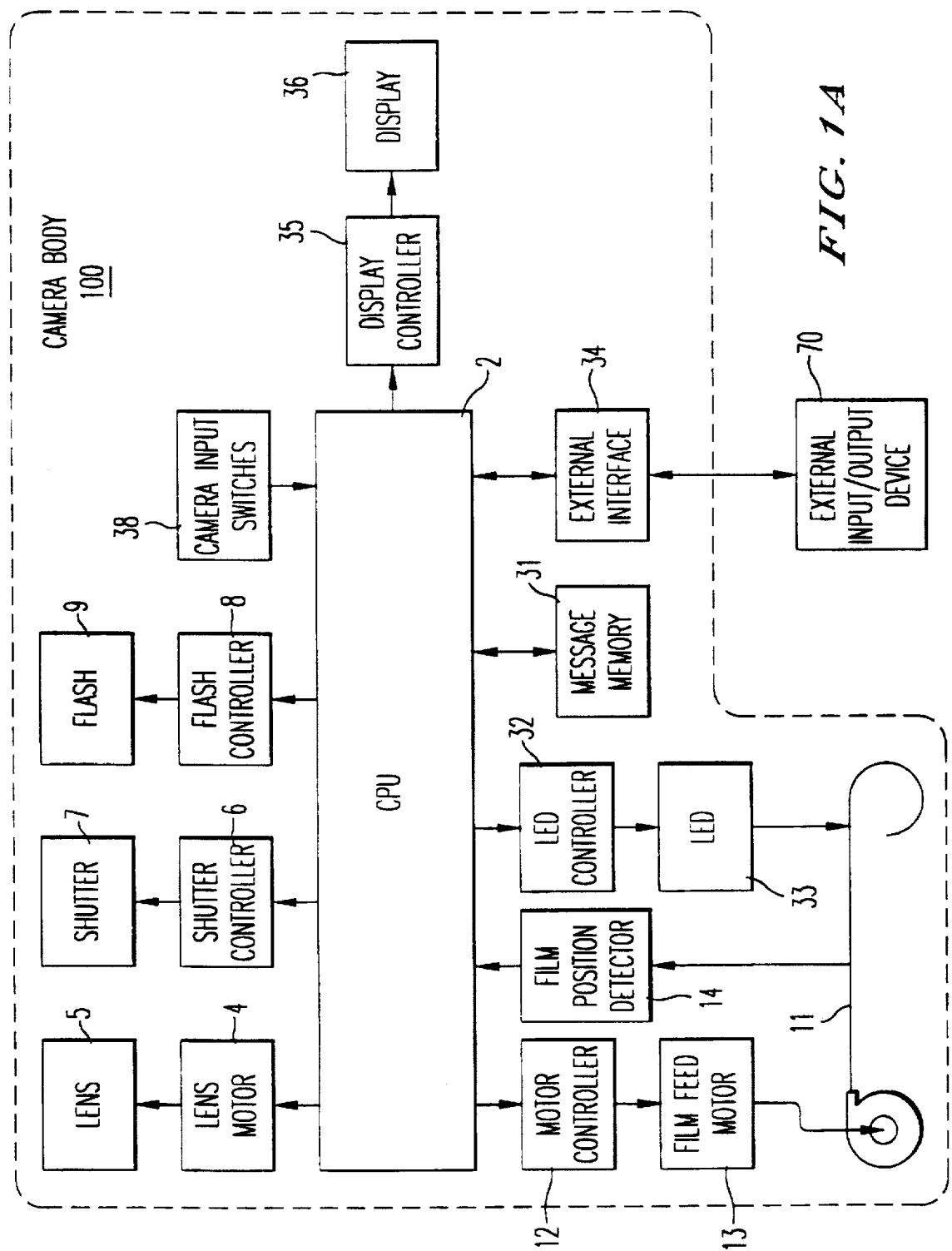
FIG. 1A illustrates a block diagram of a camera constructed in accordance with the invention.

Referring now to the drawings, wherein like reference numerals designate identical or corresponding parts throughout the several views, and more particularly to FIG. 1A thereof, there is illustrated a block diagram of a camera constructed according to the present invention. The camera includes a camera body 100 having a CPU 2 such as a microprocessor device having a RAM and a ROM for storing a control program or other processing device. Connected to the CPU 2 is a lens motor 4 connected to a lens 5. The lens motor can be used to focus and/or zoom the lens. An electronically controlled shutter 7 is connected to the CPU 2 via a shutter controller 6 so that the shutter is opened for an appropriate duration. The shutter 7 can be implemented as a sector type shutter vane which controls the aperture diameter of the lens along with the duration of film exposure. A flash 9 is connected to the CPU through the flash controller 8.

Film 11 is incorporated into a film cartridge which is contained within the camera body 100. The winding of the film is performed by a film feed motor 13 which is controlled by a motor controller 12 connected to the CPU 2. There is a film position detector 14 which detects the position of the film and informs the CPU of the detected position. In the present embodiment, a LED 33 imprints message information on the film as the film is winding after an exposure is taken. The LED 33 is controlled by the LED controller 32 which is connected to the CPU 2. By imprinting the message on the film using the LED 33 while the film is advancing, the LED 33 can be made of a single column of LEDs. There is no need to have a plurality of columns as the portion of the film to have the message imprinted will advance over the column of LEDs 33. As an alternative, the message may be imprinted on the film in any other manner such as using a matrix of LED elements. This will allow a message to be imprinted on the film without advancing the film, if desired.

The present invention relates to the manner of selecting a message to be imprinted and scrolling the messages to a user of the camera. Therefore, this invention can be applied to other types of cameras besides cameras which use film. Accordingly, the message to be imprinted on the image which has been captured would be done in an appropriate manner corresponding to the image recording medium. For example, the image can alternatively be captured using a CCD (charge coupled device) and the image and its corresponding message stored on an electromagnetic tape, solid state memory, or any other appropriate memory device. However, in this case, the displaying and selecting of the message would still be performed in accordance with the teachings herein.

The camera body 100 stores messages to be imprinted on the film in the message memory 31. The messages to be imprinted not only are preset at the factory but can also be programmed by the user. The preprogrammed messages can be stored in any type of non-volatile memory such as a ROM, EPROM, EEPROM, a flash memory, or any other type of nonvolatile memory. The messages which are input by a user must be stored in a writable non-volatile memory and can be implemented using any of the above-described memories used to implement the message memory 31, a battery backed-up CMOS RAM or any other type of writable and preferably erasable non-volatile memory. The present invention also determines and stores the frequency which each message is imprinted on the film and the message memory 31 can also store this frequency information.

One manner of storing messages within the message memory 31 is to divide the messages into three sections or parts. The memory stores a plurality of words for each of the three sections and a user can combine different words from each of the sections in order to construct the message which is imprinted on the film. As an example, the first section or memory part, section A, can have selected the words "TODAY IS," the second memory part B can have selected "MY" and the third memory part can have selected "BIRTHDAY," making the message to be imprinted read "TODAY IS MY BIRTHDAY." As an alternative, the second memory part B can have selected the word "FATHER'S" so that the selected message reads "TODAY IS FATHER'S BIRTHDAY." Exemplary words which can be stored in the first memory part A include "IT IS", "TODAY IS", "A PLEASANT", "A HAPPY", "HAPPY", "SOON", "GLAD", or no information being displayed. The group B or second part of the message to be displayed can include words such as "MY", "FATHER'S", "MOTHER'S", "BROTHER'S", "SISTER'S", "PLEASANT", or no information being displayed. The third or group C memory includes words such as "BIRTHDAY", "VACATION", "WINTER", "SUMMER", "WINTER HOLIDAY", "SPRING HOLIDAY", "SUMMER HOLIDAY", "NEW YEAR'S HOLIDAY", or no information being displayed. The various words from the three memory parts A, B, and C can be selected using the message selection switch 38G. As an alternative, the message display switch 38H can be used to view the various possible words from each memory group and once a desired word is seen, the message selection switch 38G can be used to select this word or words and then the next word or words from the next message memory part can be displayed using the message display switch 38H and selected using the message selection switch 38G. The message being displayed can also include geographical information.

An external input/output device 70 is used to program custom messages into the message memory 31. The external input/output device 70 may be implemented as a personal computer which is connected to an external interface 34 through a serial communication line. Alternatively, the external input/output device 70 may be a dedicated device which communicates with the external interface through infrared communication, RF (radio frequency) communication, or through wires or an optical link connecting the external input/output device 70 to the external interface 34. The camera is controlled through the camera input switches 38 which are explained with respect to FIG. 1B and information is displayed to the user of a camera through the display 36 which is connected to the CPU 2 through the display controller 35. A more detailed explanation of the display is given with respect to FIG. 2.

Figure 1B:
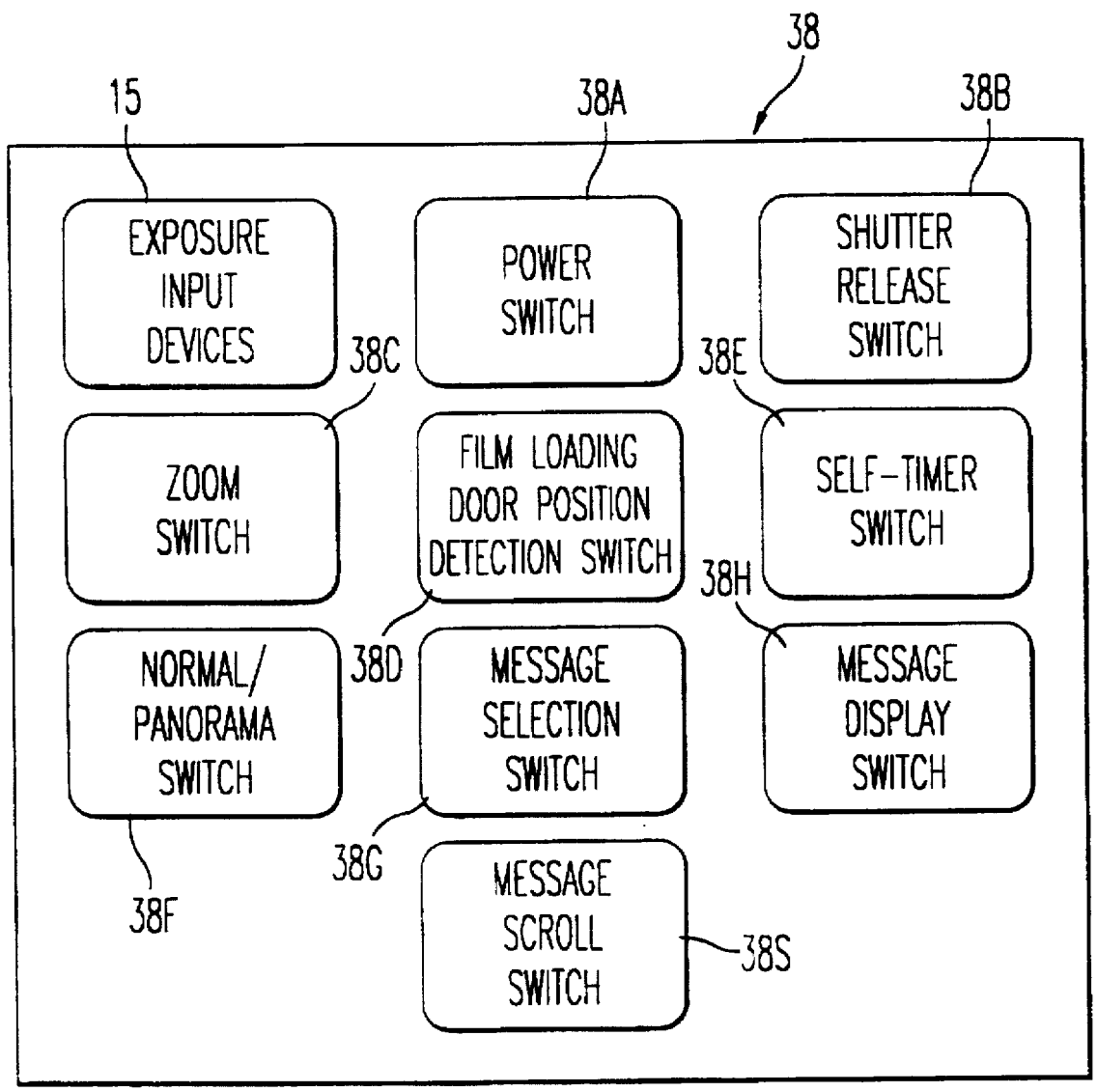
FIG. 1B illustrates the various input switches and input devices of the camera illustrated in FIG. 1A.

FIG. 1B illustrates the camera input switches 38. The camera input switches 38 include a power switch 38A for turning the power to the camera on and off. A shutter release switch 38B is used to cause the shutter to open and take a picture. There is a zoom switch 38C for zooming the lens to a telescopic or wide angle view. There is a film loading door position detection switch 38D which determines that the rear door of the camera is open or closed. When the film loading door position detection switch 38D detects that the film loading door has been closed, the film feed motor 13 can advance in order to load the film. There is a self-timer switch 38E which causes the self-timer of the camera to operate. There is a normal/panorama switch 38F used for switching the camera from taking ordinary pictures and panorama pictures which have a larger width to height ratio than normal pictures. A message selection switch 38G is used to select the message to be displayed, a message display switch 38H is used to display a message to a user, and a message scroll switch 38S is used to scroll a message on the display to a user. The exposure input devices 15 are conventional input devices used to provide inputs to the CPU 2 which determines the amount of light to which the film is to be exposed. These exposure input devices can include a switch for setting the film speed or an automatic detection sensor which senses the film speed which has been coded on the film canister. Further, the exposure input devices 15 include a light sensor, and optionally switching devices to set the shutter speed and aperture. Each of the switches and input devices making up the camera input switches 38 are read by the CPU 2 or through a switch reading device which functions to scan the switches and input devices in a similar manner as a conventional computer keyboard is scanned to determine which switch has been pressed.

FIG. 2 is a detailed illustration of the display device 36. This display is mounted to an exterior portion of the camera but can also be constructed to be visible through the viewfinder, if desired. This display is constructed of LCD display elements.

The display 36 includes a six-digit numeric display 51, each digit including 7 segments. This display section 51 is primarily used for displaying the date or time. Alternatively, the number of exposures taken or remaining is displayed on this section. There are three pairs of seven segment numbers 51A, 51B and 51C. The display parts 51D, 51E and 51F are auxiliary display parts positioned in front of the first digit of each pair. These display parts 51D, 51E and 51F are apostrophes and are utilized to indicate that the pair of numbers which is being displayed indicates a year (e.g., '96). The colon designated by 51G can be used when time is displayed.

Under ordinary or normal circumstances, the display part 51 may be set to a date display mode. In this case, it will be necessary to inform the user of a number of exposures taken or remaining. In this case, the exposure information can be displayed in the display part 52 or alternatively, another display part of the display 36. It is possible for a message to be displayed or scrolled on the display part 52 and when the message is finished being displayed or scrolled and an ordinary or normal mode is subsequently used, the display part 52 can then display the number of exposures taken or remaining.

The display 36 includes a dot matrix display 52 having, for example, seven vertical dots by 14 horizontal dots. This dot matrix display 52 can be used to display any desired alphanumeric information including Chinese and Japanese characters. The display 52 is preferably used to display messages which are to be imprinted on the film or messages which are selected to be imprinted on the film.

There is a display part 53 used to indicate the state of the camera battery, a display part 54 for showing that the film is advancing or alternatively rewinding within the camera, and a display part 55 having three sections which can be utilized to indicate whether an object to be photographed is near, a medium distance, or far away from the camera. Alternatively, this display part 55 can be utilized to display whether the camera is focusing based on a left, center or right part of the image within the viewfinder.

Three display segments 56 are used to indicate the charging state of the power source of the flash. The display part 57 is utilized to indicate that the flash is fully charged. The display part 58, when only the jagged arrow is illuminated, indicates the flash is turned on and when the circle having the slash therethrough is illuminated in conjunction with the arrow, the display connotes that the flash is turned off. The display part 59 indicates whether the camera is in an autofocus mode and the display part 60 is utilized to indicate that a night mode of photography has been selected. The night mode allows both a long exposure time in order to have background images sufficiently exposed, and also utilizes a flash to have objects at the front of the display sufficiently illuminated and clear.

Figure 3A:
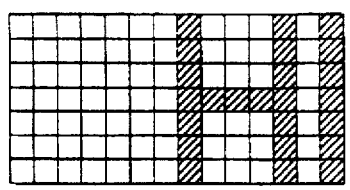
FIGS. 3A–3C illustrate a portion of scrolling the message "HAPPY BIRTHDAY"
Figure 3B:
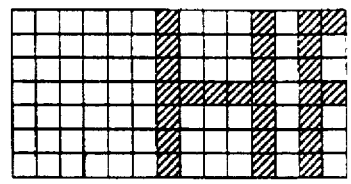
Figure 3C:
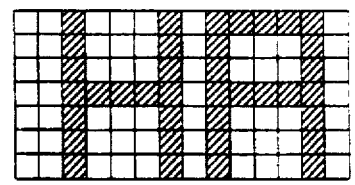

FIGS. 3A–3C illustrate various states of scrolling the message "HAPPY BIRTHDAY" across the dot matrix display. FIG. 3A illustrates the display of the letter "H" and a single column of pixels of the letter "A." FIG. 3B illustrates the message scrolled one column of pixels to the left. In this case, all information illustrated in FIG. 3A is shifted one column to the left and the right-most column has displayed therein the second column of the letter "A" which includes a pixel being displayed at the very top and the middle of the right-most column. In FIG. 3C, the display has advanced to the point where both the letters "H" and "A" are displayed.

Figure 4A:
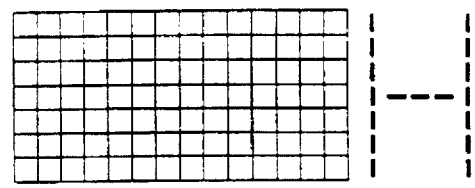
FIGS. 4A and 4B illustrate two possible ways of beginning the scrolling operation.
Figure 4B:
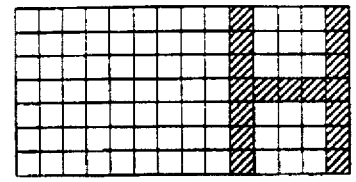

The present invention is concerned with the scrolling of message information across the dot matrix display 52 of the display 36. In order to properly scroll the message, various parameters must be first determined relating to how the message is scrolled. For example, a first concern is whether the display is initially blank or whether the first letter or character of the message is displayed upon the start of scrolling. FIG. 4A illustrates using broken lines the letter H being to the right of the display, meaning that at the start of the scrolling, the display is blank. Alternatively, FIG. 4B illustrates that the start of the scrolling begins by displaying in its entirety the first letter or character of the message. As a further alternative, it is possible to begin the scrolling operation by displaying the left-most column of pixels of the first character in the right-most column of the display. This would mean that for the letter "H" in the "HAPPY BIRTHDAY" message, each pixel in the right-most column of the display is turned on.

Figure 5A:
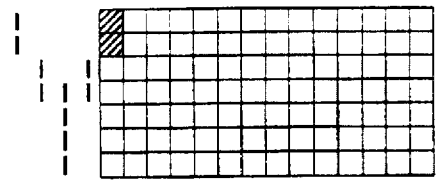
FIGS. 5A and 5B illustrate two possible ways of terminating the scrolling operation.
Figure 5B:
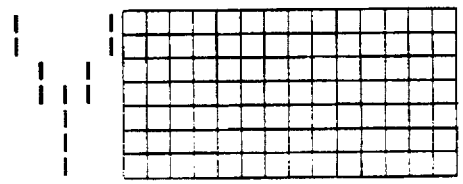

Another factor in calculation of the scrolling time is what is to be considered the last information which is displayed at the end of scrolling. FIG. 5A illustrates that the right-most column of pixels of the letter "Y" from the message "HAPPY BIRTHDAY" are displayed at the end of the scrolling operation. Alternatively, the last character may be completely scrolled off the screen as illustrated in FIG. 5B for performing the calculations of the scroll time.

Figure 6A:
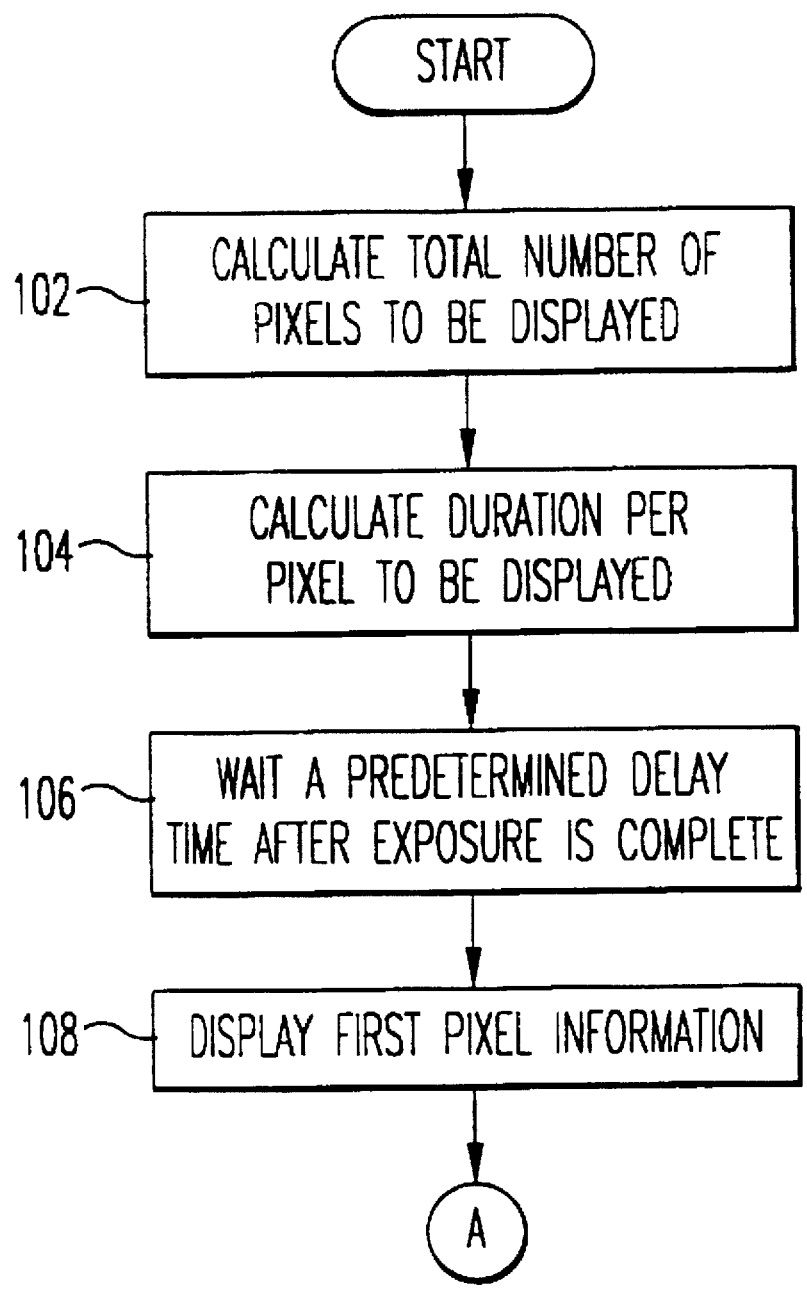
FIGS. 6A and 6B illustrate a flowchart for scrolling information.
Figure 6B:
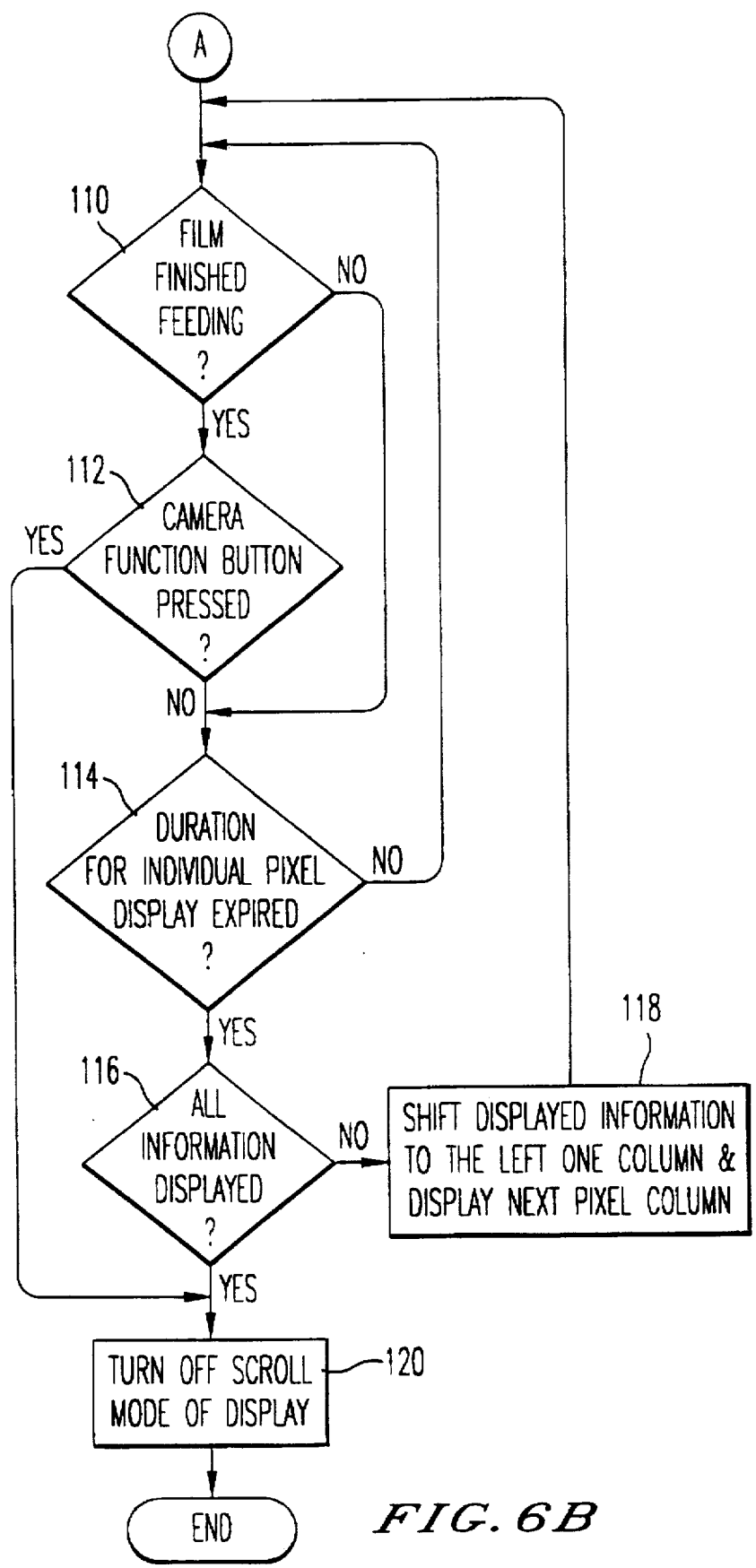

FIGS. 6A and 6B are a flowchart illustrating the process for scrolling characters across the dot matrix display 52 including the manner of calculating the scroll time. After starting, step 102 calculates the total number of pixels to be displayed and step 104 calculates the duration for each pixel which is to be displayed (i.e., the time duration before the display is shifted to the left by one pixel). The duration $T_p$ for each pixel to be displayed is equal to the total time $T$ allotted for scrolling divided by the total number of pixels to be displayed $N_p$.

$$T_P = \frac{T}{N_P} \quad (1)$$

The total time T during which the display will be scrolled should be at least as long as the time $T_W$ it takes to advance the film one frame. However, this time may be too short for the scrolling operation and accordingly, a predetermined time period α added to the film wind time $T_W$ which is about 0.3–0.6 seconds so that the value of T is approximately one to three seconds.

$$T = T_W + \alpha \quad (2)$$

The total number of pixels to be displayed $N_p$ is based on the pixels from the characters of the message $N_C$, the pixels resulting from the spaces between the characters of the message $N_{SP}$, and pixels which make up the width of the display screen $N_{SC}$.

$$N_P = N_C + N_{SP} + N_{SC} \quad (3)$$

The pixels from the characters $N_C$ will be the number of characters of the message plus one multiplied by the number of pixels for the width of the character.

$$N_C + (C+1) * 5 \quad (4A)$$

However, this value $N_C$ for the number of pixels from characters is based on a starting position corresponding to what is illustrated and has been explained with respect to FIG. 4A. However, when the starting position of the scrolling operation is as illustrated in FIG. 4B, the pixels from the characters $N_C$ is the number of characters C of the message multiplied by the number of pixels making up the width of each character. In this case and in the case corresponding to FIG. 4A, the number of pixels making up the width of the character is five. Accordingly, the equation corresponding to this situation is $$N_C = C * 5 \quad (4B)$$

The pixels $N_{SP}$ resulting from the spaces between the characters making up the messages is equal to the number of characters minus one.

$$N_{SP} = C - 1 \quad (5)$$

The number of pixels $N_{SC}$ resulting from the width of the screen is simply the width of the screen in the case when the last character is calculated as being completely scrolled off the screen as illustrated in FIG. 5B.

$$N_{SC} = W_{SC} \quad (6A)$$

However, when the right-most column of the last character to be displayed is considered to have ended when in the position illustrated in FIG. 5A, the number of pixels $N_{SC}$ resulting from the width of the screen is equal to the width of the screen in pixels minus one.

$$N_{SC} = W_{SC} - 1 \quad (6B)$$

The above-described equations result in a constant scroll time. However the time α, described above, can be used to vary T, if desired, based on the message length. By varying α in this manner, the scroll speed will change based on message length and the total time to complete the scrolling would also vary for different length messages.

After performing steps 102 and 104 as explained above with respect to Equations 1–6B, there is a predetermined delay time of approximately one to two seconds after the exposure is complete in step 106. This delay time is utilized in order for the user to move his eye from the viewfinder to look at the display 52 which is typically on the top of the camera. However, if the camera is constructed so that there can be a scrolling operation which is visible through the viewfinder, this delay time can be reduced or eliminated. After the predetermined delay time expires, step 108 is performed which displays the first pixel information. The first pixel information may either be the left-most column of the first character to be displayed. Alternatively, if the first pixel information to be displayed is the entire first character, as illustrated in FIG. 4B, this first character is displayed as illustrated in FIG. 4B. The flow then proceeds to process A illustrated in FIG. 6B.

In FIG. 6B, step 110 determines if the film has finished feeding and is ready for the next exposure. At the beginning of the winding operation, the film will not be finished feeding and flow will proceed to step 114 which determines if the time duration $T_p$ for this particular pixel display has expired. If it has not, the loop of steps 110, 112, and 114 will be repeated. If the time $T_p$ is determined to have expired in step 114, step 116 determines if all information (e.g. all characters of the message imprinted on the film) have been displayed to the user. If they have not, flow proceeds to step 118 which shifts the displayed information to the left one column and displays the next pixel column in the right-most column of the display. Flow then returns back to step 110.

If step 110 determines that the film has finished feeding, step 112 determines if a camera function button has been pressed. This camera function button can be any of the switches illustrated in FIG. 1B. For example, if the user switches from the normal to panorama switch, it is probable that the user will no longer be interested in the message which is being scrolled but wants to set up the next picture. The most likely function buttons pertaining to step 112 are the zoom switch 38C, the self-timer switch 38E, the normal/panorama switch 38F, or the message selection, display or scroll switches 38G, 38H, and 38S, respectively. However, any of the switches illustrated in FIG. 1B can be utilized as the camera function button in step 112. An affirmative response from step 112 or an affirmative response from step 116 which indicates that all information has been displayed turns off the scroll mode of the display in step 120. At this time, the screen is returned to a normal mode meaning that the next exposure can be set-up and if desired, the display 52 displays the number of exposures taken or remaining. The normal mode preferably displays the number of exposures using the dot matrix display. The process of FIGS. 6A and 6B then ends. In this embodiment, the message displayed to the user is the same as the message imprinted on the film. As an alternative, the information displayed to the user may vary from the message imprinted on the film but will still correspond to the information imprinted on the film.

Figure 7A:
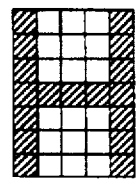
FIGS. 7A–7C illustrate the beginning of the display of the message "HAPPY BIRTHDAY" in which one character at a time is displayed to the user.
Figure 7B:
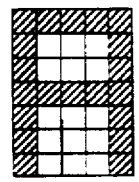

As an alternative to scrolling the message to the user, the display can sequentially switch between the characters of a message. For example, assuming again that the message to be displayed is "HAPPY BIRTHDAY," first the H is displayed as illustrated in FIG. 7A, then A is displayed as illustrated in FIG. 7B, followed by P in FIG. 7C. This process repeats for each letter or character of the message until all characters have been displayed. The duration that each character is displayed varies with the number of characters in the message. Accordingly, it is necessary to calculate the duration for each character, depending upon the total number of characters to be displayed.

Figure 8A:
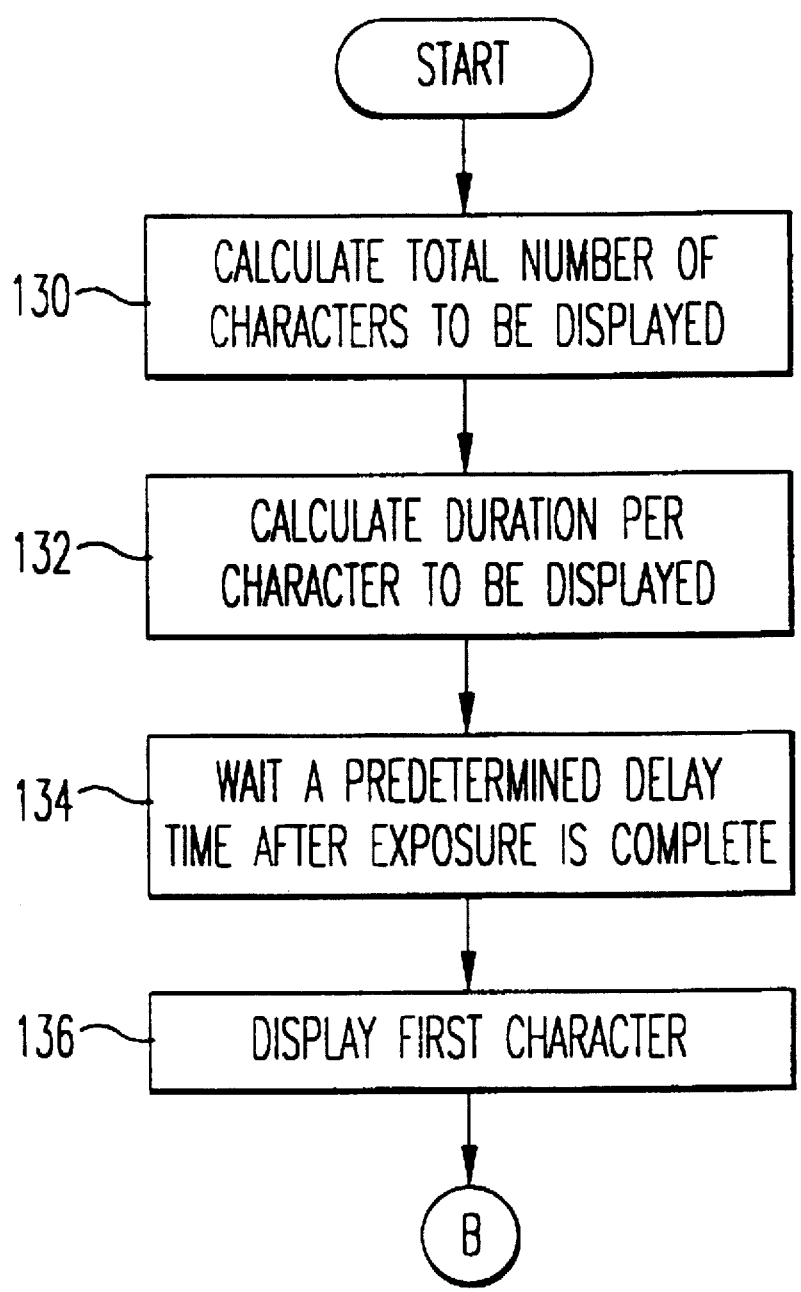
FIGS. 8A and 8B illustrate a flowchart of a process for displaying one character at a time to a user.
Figure 8B:
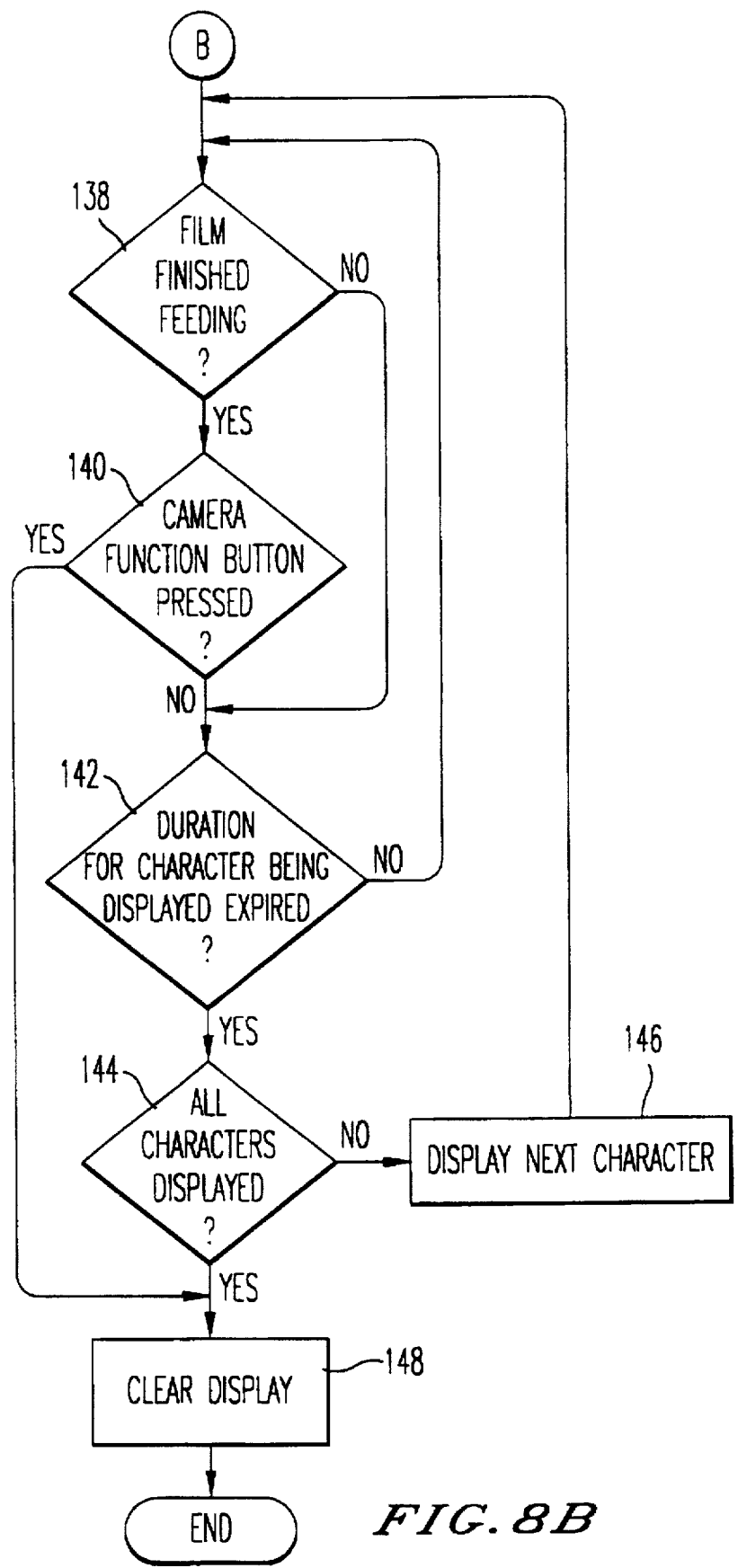

FIGS. 8A and 8B illustrate the flowcharts for sequentially displaying messages. After starting, step 130 calculates the total number of characters to be displayed. This number simply corresponds to the number of characters of the message and corresponds to the variable "C" described with respect to FIGS. 4A and 4B. Next, the duration that each character is to be displayed is calculated in step 132. The duration is equal to the total time for display T as defined in equation two above divided by C.

$$T_C = T \div C \tag{7}$$

In step 134, a predetermined period of time such as one to two seconds are waited to elapse after the exposure is complete in order for the user to move his or her eye from the view finder to the dot matrix message display. Next, the first character of the message is displayed in step 136 (see e.g., FIG. 7A) and flow proceeds to process B illustrated in FIG. 8B.

In process B illustrated in FIG. 8B, the steps performed are the same as or correspond to the steps performed in FIG. 6B except that instead of shifting or scrolling the information to be displayed to the user in step 118, step 146 is performed which displays the next character in place of the current character being displayed. In step 148, the display is cleared and used for whatever functions are desired, for example the display of the number of exposures taken or remaining.

Figure 7C:
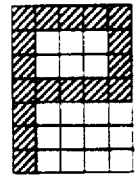

As an alternative to displaying single characters, as illustrated in FIGS. 7A–7C, two or more characters can be displayed at a time as illustrated in FIGS. 9A–9C. In this case, step 130 will calculate the total number of display screens which are needed by dividing the number of characters to be displayed by the number of characters which can be displayed at once, and rounding up the result to the nearest integer. For example, if seven characters are to be displayed and the screen can display two characters at a time, there will need to be three and one half display operations but as it is not possible to perform a one half display operation, four display operations will be needed. The calculation in step 132 will calculate the duration for each screen display by dividing the total time allocated for the display T by the number of screens to be displayed.

In the present invention, it is preferable that the number of pixels in the dot matrix display 52 be as large as possible so that it is easy for a user to recognize a syllable of a word. In order to reduce manufacturing cost, it is desirable to reduce the number of pixels of the dot matrix display 52 to be as small as possible. However, if the characters are not scrolled but displayed one, two or more at a time as illustrated in FIGS. 7A–7C and 9A–9C, it may be difficult for the user to recognize pronunciation of some of the letters or characters. For example, when only a portion of the letters making up a syllable are displayed, the pronunciation may not be clear. Therefore, if possible, it would be preferable to have as many characters displayed as possible. As a specific example, suppose the display only showed two characters at a time and the characters "JA" were displayed. It might be unclear to the user as to whether the two characters "JA" were pronounced as in the word "January" or as for the name "Jamie." Therefore, if possible, when characters are sequentially displayed, it is preferable to display the characters in complete syllables. However, this may not be possible when the screen is small.

The above-described embodiments are satisfactory for displaying characters of messages to a user. However, possible problems with these embodiments is that the dot-matrix display on which the characters are displayed may be expensive or small in size. If there are a large number of characters to be displayed, in order to scroll in the appropriate amount of time, it is possible that the scroll speed may be too fast for a user. Accordingly, an alternative embodiment of the invention does not display the characters forming the message to a user but simply displays an indication that some type of information has been recorded on the film.

Figure 10:
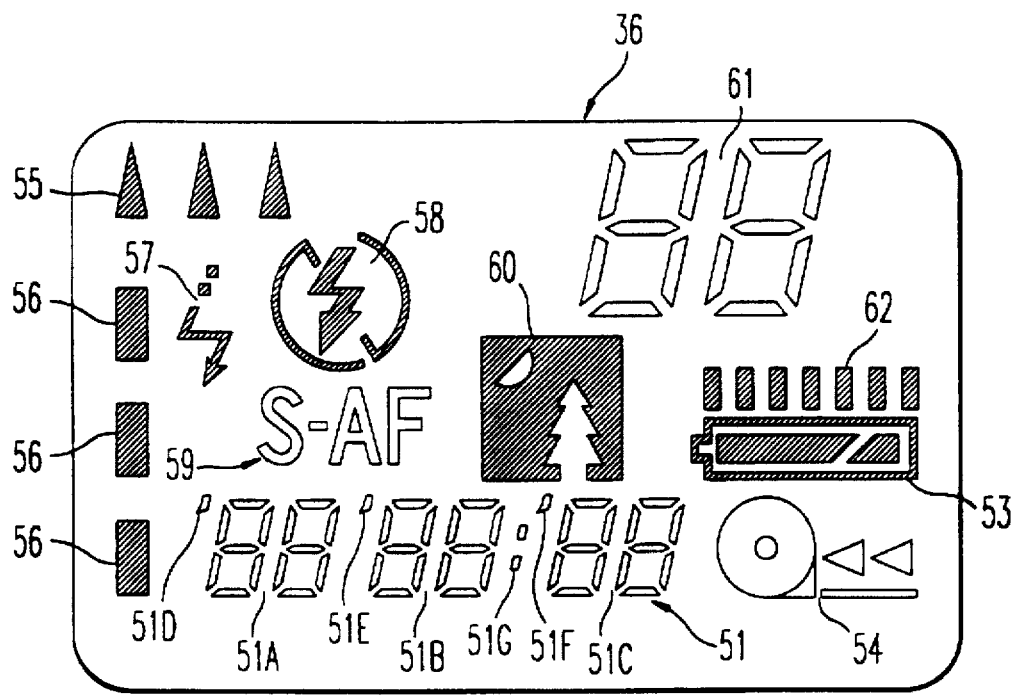
FIG. 10 illustrates the display 36 of the camera having a series of display bars 62.
Figure 11:
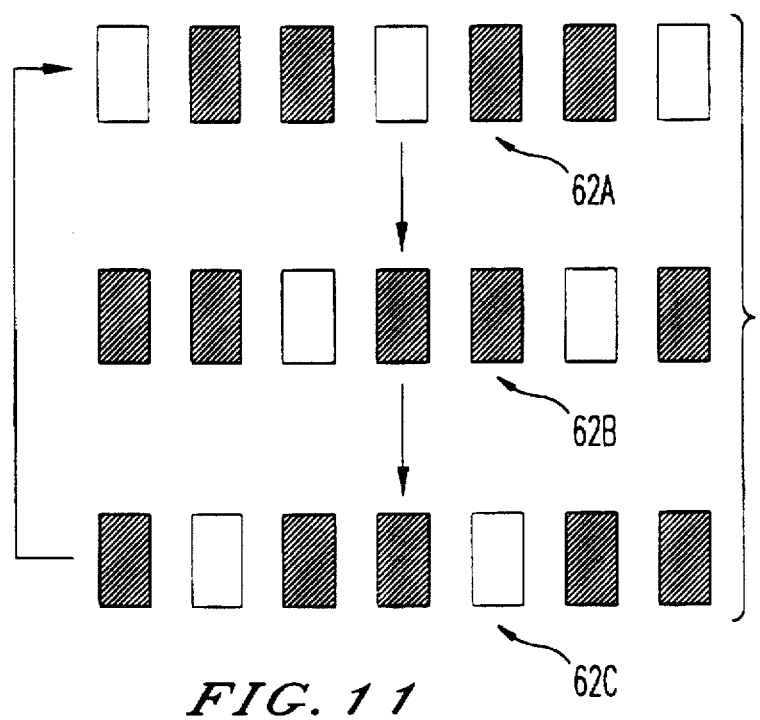
FIG. 11 illustrates the manner of illuminating the display bars 62 to indicate that information has been imprinted on the film.

Turning now to the display illustrated in FIG. 10, there are two, seven digit numbers 61 which can be used to display the number of exposures taken or remaining on the film. This display part 61 replaces the dot matrix display 52 illustrated in FIG. 2. Another difference between the display illustrated in FIG. 2 and the display of FIG. 10 is the inclusion of seven rectangular shaped display elements 62. When a message is recorded on the film, the display can alternate as illustrated in FIG. 11. At first, the display is as designated by 62A. The display then switches to the form designated by 62B. Subsequently, the display switches to 62C, and finally returns back to the form illustrated in 62A. The changing of display information for the LCD display elements designated by 62 can occur for the same amount of time as the total display time the messages are scrolled or displayed in the earlier embodiments. As an alternative to the rectangular display elements making up the display section 62, circles, squares, or any other shape display elements can be utilized.

Figure 12:
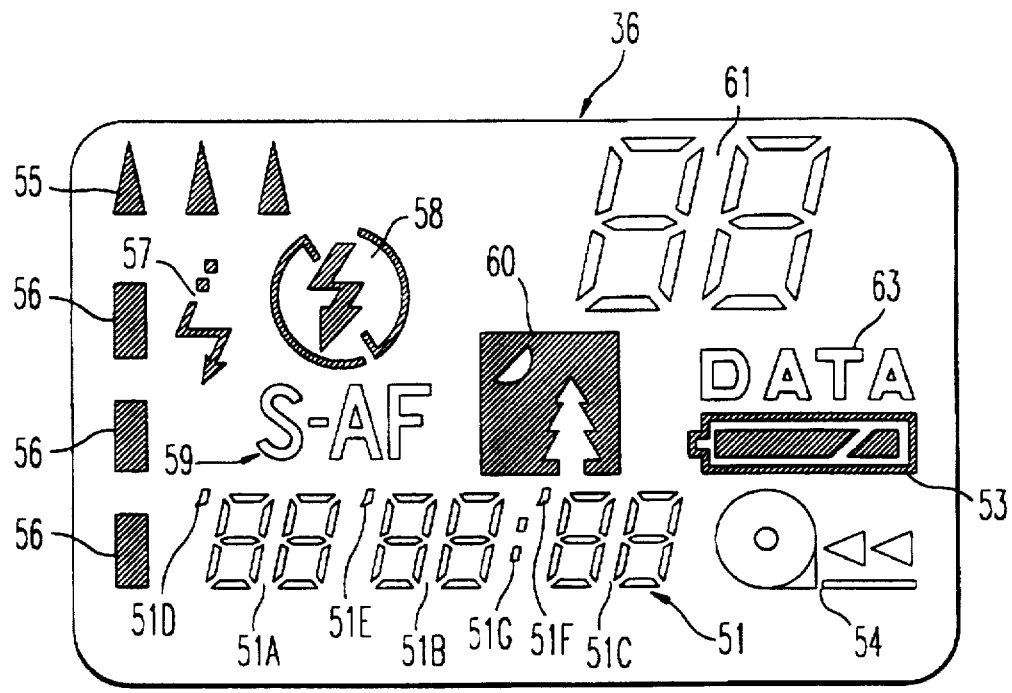
FIG. 12 illustrates an alternative user display 36 which includes a display for the word "DATA"
Figure 13:
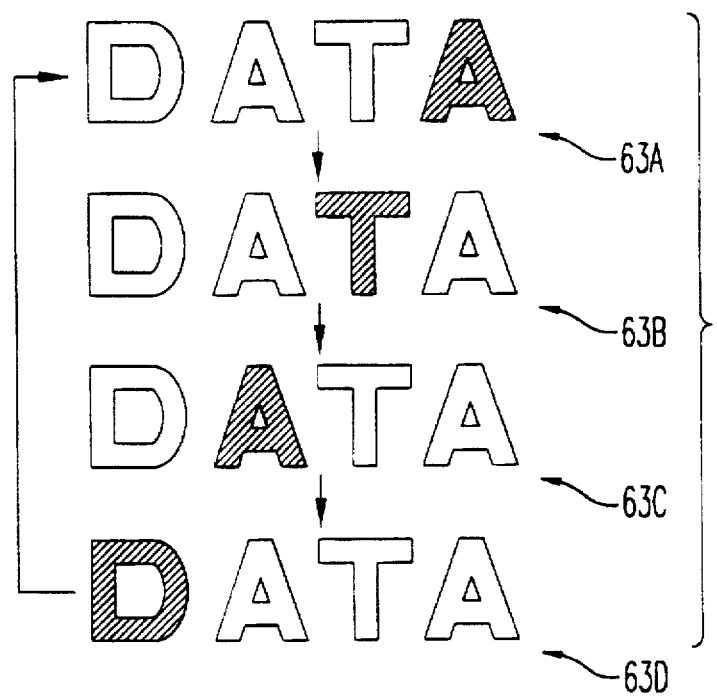
FIG. 13 illustrates the manner of alternatively illuminating the characters of the word "DATA" in order to indicate that information has been imprinted on film.

As an alternative to the rectangular display elements 62 illustrated in FIG. 10, a display 63 of FIG. 12 which states the word "DATA" may be used and scrolled through as illustrated in FIG. 13. In FIG. 13, the letters D A T A are alternatively displayed or turned on. As a further alternative, the six-digit display 51 may have the numerals alternatively displayed or turned on so that the numerals are scrolled in a similar manner as illustrated in FIG. 13 with respect to the word "DATA" or similar to the manner of scrolling illustrated in FIG. 11 where a plurality of elements are scrolled or displayed at the same time.

With respect to the displaying performed in FIGS. 10–13, the number of characters in the message can be roughly indicated in the time duration of the scrolling or displaying based on the number of characters of the message. In this manner, the user will readily be able to ascertain whether the message which has been imprinted on the film has a small or large number of characters.

Additionally, in each of the embodiments, the year, month and day, or time can be imprinted on the film in addition to the character message.

Another feature of the present invention is the manner of selecting and displaying messages which are to be imprinted onto the film. The embodiment illustrated in FIG. 14 only requires one switch or button to select and display messages which are to be imprinted on the film. In the flowchart illustrated in FIG. 14, only the message display switch 38H is utilized to both display and select messages. Accordingly, it is possible, if desired, to omit the message selection switch 38G and message scroll switch 38S.

Figure 14:
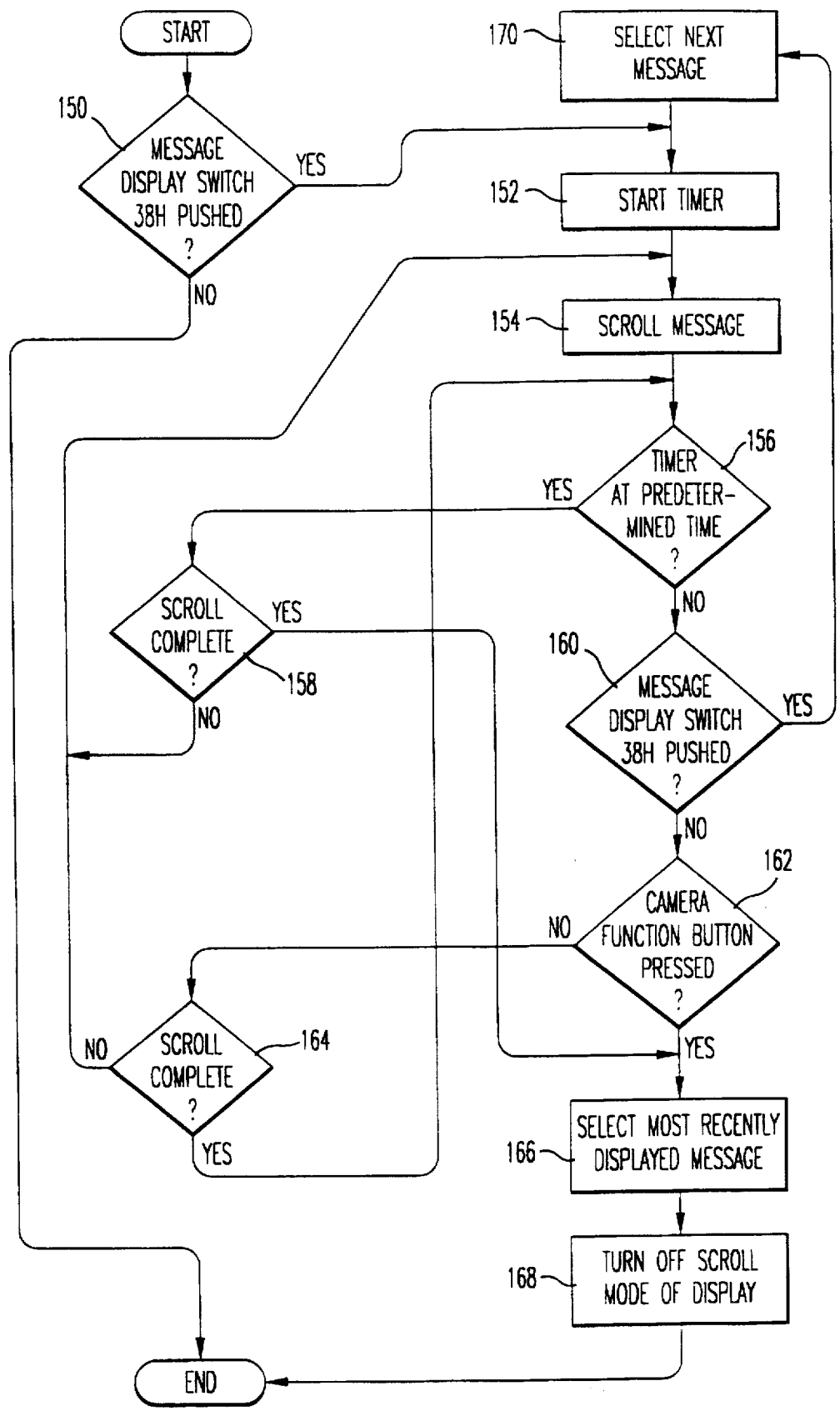
FIG. 14 is a flowchart for selecting a message to be displayed in which messages are scrolled across the display.

In FIG. 14, after starting, step 150 determines if the message display switch 38H has been pushed. If it has not, the process of FIG. 14 ends and if the switch has been pushed, flow proceeds to step 152 where a timer is started. In step 154, the message begins to be scrolled across the dot matrix display 52 at a speed determined, for example, in accordance with the manner of determining scrolling speed and duration set forth in the flowchart of FIGS. 6A and 6B. Step 156 then determines if a predetermined time has expired. This time period is preferably set in the range between two and six seconds. If the user does not press the message display switch 38H within the predetermined time period in step 156, the ultimate result is that the most recently displayed message is selected for imprinting on the film during the next exposure.

If the predetermined time period is determined not to have elapsed in step 156, flow proceeds to step 160 which determines if the message switch 38H has been pushed again. If it has, the user has indicated that he or she is interested in viewing the next message and flow proceeds to step 170 which selects the next message. The present invention stores in an erasable non-volatile memory such as the message memory 31, the frequency which each of the messages if imprinted on the film. In the flowchart of this embodiment, the first message which is displayed to the user is the most frequently utilized message, the second message which is displayed to the user is the second most frequently utilized message, and so on. After the next message is selected in step 170, flow returns back to step 152 which repeats the previously described process.

If step 156 determines that the predetermined time has elapsed, the user can no longer select another message and flow proceeds to step 158. In step 158, if the scrolling is determined to have been completed, flow proceeds to step 166 which selects the most recently displayed message and step 168 turns off the scroll mode of the display and exposure information may then be displayed on the dot matrix display 52, if the user desires. Alternatively, if step 158 determines that the scrolling is not complete, flow proceeds back to step 154 where the message continues to be scrolled.

If step 160 determines that the message display switch 38H has not been pushed, step 162 examines if one of the camera function buttons has been pressed. These function buttons correspond to the switches illustrated in FIG. 1B and are the same function buttons which have been described with respect to step 140 in FIG. 8B. If step 162 determines that a camera function button such as the zoom switch or automatic timer has been pressed, it means that the user is no longer interested in displaying further messages and the most recently displayed message is selected in step 166 and the scroll mode of the display is turned off in step 168. If the camera function button is determined not to be pressed in step 162, flow proceeds to step 164 which determines if the scrolling is complete. If scrolling is not complete, the message continues to be scrolled in step 154 and if the scrolling is complete, flow returns to step 156 which determines if the predetermined amount of time has expired.

The embodiment illustrated in FIG. 14 provides a simple and quick manner for the user to view and select the messages which are to be imprinted on the film. Further, as the messages are preferably presented in the order of most frequent use, the chances are that the user will most quickly be able to find the message which he or she desires.

Figure 15:
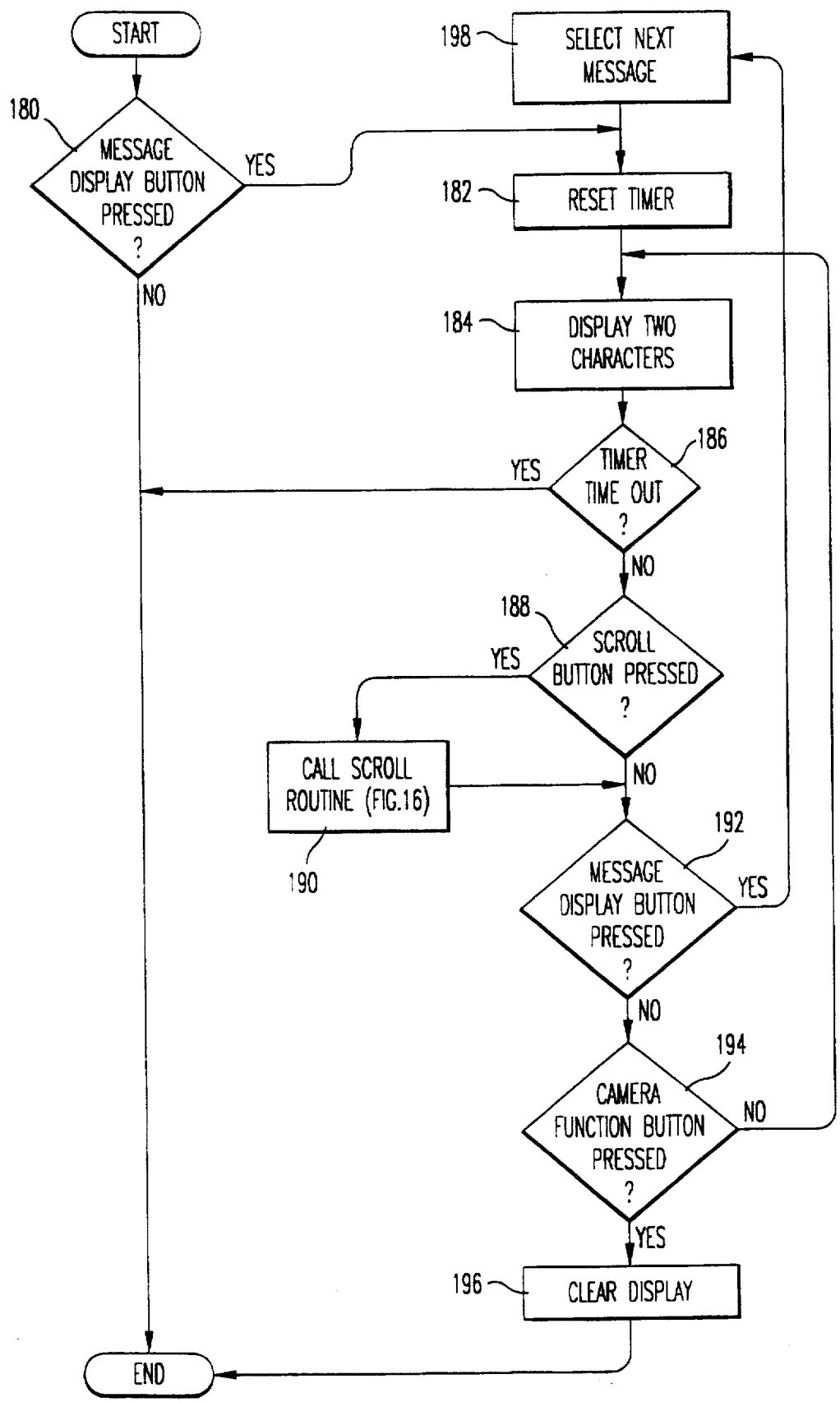
FIG. 15 is a flowchart illustrating a manner of selecting messages to be imprinted which utilizes both a display of two characters and a scrolling of the characters.
Figure 16:
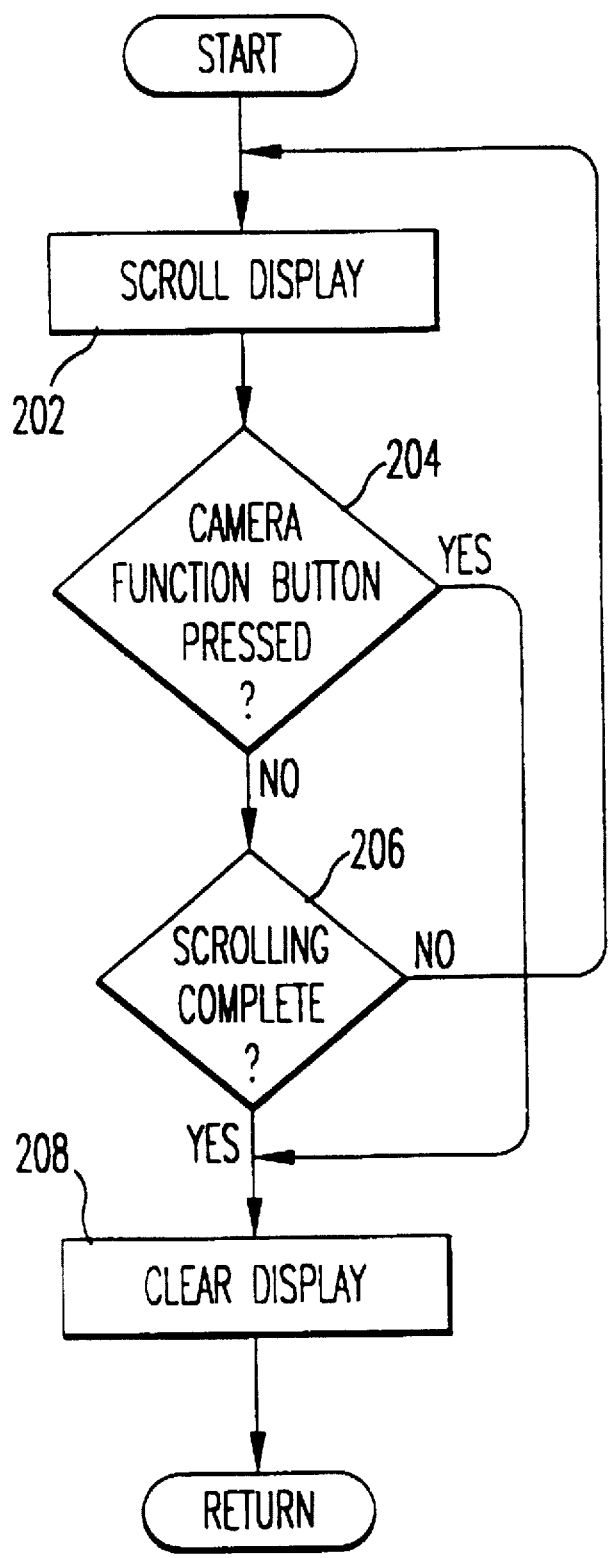
FIG. 16 is a flowchart of a scrolling routine which is called by the flowchart illustrated in FIG. 15.

FIGS. 15 and 16 illustrate flowcharts of an alternative embodiment for displaying and choosing messages which are to be imprinted on the film. In this embodiment, it is necessary for the camera to have two messages switches or buttons; one of these buttons is a message display button, corresponding to the message display switch 38H illustrated in FIG. 1B, and the other button corresponds to the message scroll switch 38S illustrated in FIG. 1B. In this embodiment, when the message display button or switch is pressed, two characters, for example, are displayed to a user. If the user subsequently presses the scroll button, the entire message is scrolled. If the user then subsequently presses the message display button, the next message is selected.

Turning now to the specific steps illustrated in FIG. 15, after starting, step 180 determines if the message selection button has been pressed. If it has, flow proceeds to step 182 which resets and starts a timer. The first two characters of the most frequently used message are displayed. If step 186 determines that the timer times out (e.g. two-six seconds have elapsed), the process of FIG. 15 ends. If the timer has not reached the predetermined time such as two to six seconds, flow proceeds to step 188 which determines if the scroll button has been pressed. If it has, the entire message is scrolled in step 190 in accordance with the flowchart illustrated in FIG. 16, which is explained below.

If the scroll button has not been determined to be pressed in step 188, step 192 determines if the message display button has been pressed. If it has, flow proceeds to step 198 and the next message is selected and flow proceeds to step 182 for repeating of the previously described steps. If step 192 determines that the message display button has not been pressed, step 194 determines if one of the camera function buttons, as described above, such as the zoom, automatic timer, or shutter release button has been pressed. If a camera function button has not been pressed, flow proceeds back to step 184 which continues the display of the two characters. If the camera function button has been pressed, indicating that the user is no longer interested in viewing messages to be imprinted on the film, step 196 clears the display and if desired, other information can be displayed in the dot matrix display 52, such as the number of exposures taken or remaining on the film. The process of FIG. 15 then ends.

FIG. 16 illustrates the scroll routine which is performed in accordance with step 190 of FIG. 15. When the scroll button has been pressed, step 202 begins the scrolling of the display. If a camera function button has been pressed, as described above, the display is cleared in step 208 and returned to its normal use. If the camera function has not been pressed, flow proceeds to step 206 which determines if the scrolling is complete. If it is not, scrolling is continued in step 202. If scrolling is complete, the display is cleared in step 208 and the dot matrix display 52 is returned to its normal state. Flow then returns to the calling procedure.

Figure 17:
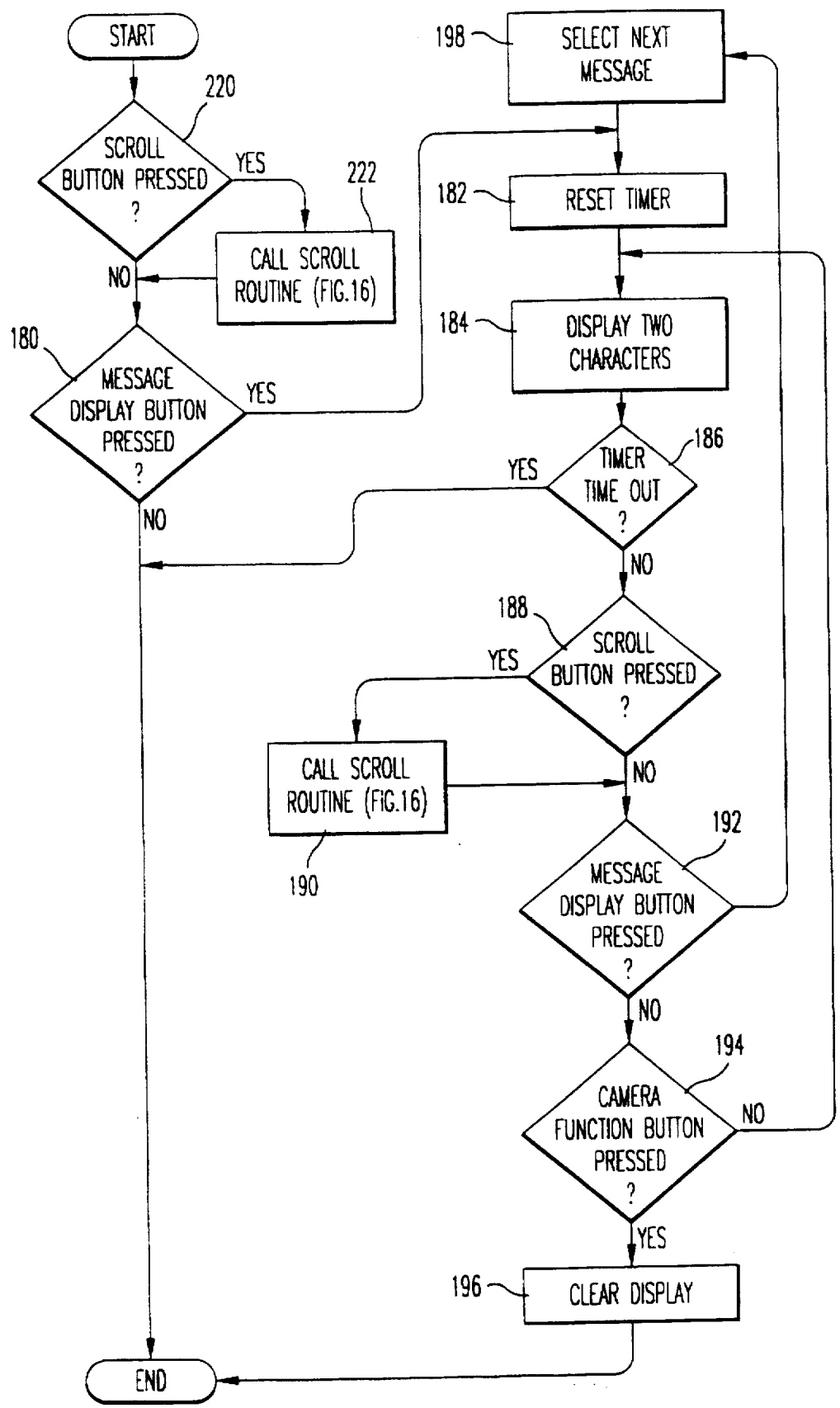
FIG. 17 is a flowchart for displaying and scrolling messages which is similar to the flowchart illustrated in FIG. 15 and allows messages to be scrolled at the beginning of the process.

FIG. 17 illustrates a flowchart similar to FIG. 15 but contains two additional steps. Step 220 allows the user to initially press the scroll button and when the scroll button is pressed, step 222 causes the scroll routine of FIG. 16 to be performed. Otherwise, all other steps in FIG. 17 are the same as the steps illustrated in FIG. 15.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. For example, as an alternative to recording the messages on light-sensitive photographic film, the film may contain a magnetic recording surface onto which electromagnetic signals are recorded which correspond to the message. Alternatively, the message can be stored on an image storing medium or data storage medium in any format which is desired. It is therefore to be understood that within the scope of the appended claims, the invention may be practiced otherwise than as specifically described herein.

What is claimed as new and is desired to be secured by Letters Patent of the United States is:

1. A method for recording and displaying information, comprising the steps of:
   capturing an image;
   recording a message which corresponds to the image;
   calculating a speed at which information, corresponding to the message, is to be displayed to a user, based on a length of the message; and
   displaying, on a display, the information at the speed which has been calculated.

2. A method according to claim 1, wherein the capturing and recording steps capture and record on a light sensitive film.

3. A method according to claim 1, wherein:
   the step of calculating the speed calculates a scroll speed; and
   the step of displaying scrolls the information on the display at the scroll speed.

4. A method according to claim 3, wherein:
   the step of calculating calculates the scroll speed so that a message having a first number of characters results in the speed being faster than when the message has a second number of characters which is less than the first number of characters.

5. A method according to claim 3, wherein:
   the step of calculating calculates the scroll speed using a width of the display.

6. A method according to claim 1, wherein:
   the step of calculating calculates the speed using a number of characters of the message.

7. A method according to claim 1, wherein:
   the step of displaying always displays whole characters of the message without scrolling the characters onto or off of the display.

8. A method according to claim 7, wherein:
   the step of displaying displays whole characters, one at a time.

9. A method according to claim 7, wherein:
   the step of displaying displays whole characters, two at a time.

10. A method according to claim 1, wherein:
    the step of displaying displays the information in a constant time period without regard to a length of the information.

11. A method according to claim 1, wherein:
    the displaying step displays the information which is said message.

12. A method according to claim 1, further comprising the step of:
    selecting a message by selecting a first portion of the message from a first group of words and selecting a second portion of the message from a second group of words.

13. A method according to claim 1, wherein:
    the step of displaying terminates the displaying of the information when a function switch is pressed.

14. A method according to claim 13, wherein:
    the step of displaying terminates the displaying of the information when the function switch, selected from the group consisting of a zoom switch, a self-timer switch, an exposure switch, and a normal/panorama switch, is pressed.

15. A method for recording and displaying information, comprising the steps of:
    capturing an image;
    recording a message which corresponds to the image which has been captured; and
    displaying, on a display, a graphical indication that the message has been recorded without displaying the message to the user.

16. A method according to claim 15, wherein:
    the displaying step displays a graphical indication which includes a series of objects.

17. A method according to claim 16, wherein:
    the displaying step displays a series of rectangles.

18. A method according to claim 15, wherein:
    the displaying step displays turns on different components of the graphical indication at different times.

19. A method according to claim 15, wherein:
    the displaying step displays the graphical indication which includes a plurality of characters which are not related to a content of the message.

20. A method according to claim 19, wherein:
    the displaying step displays the graphical indication which includes a plurality of alphabetic characters.

21. A method according to claim 20, wherein:
    the displaying step displays the graphical indication which includes alphabetic characters "D A T A".

22. A method of selecting a message to be recorded for a captured image, comprising the steps of:
    pressing a switch on an image capturing apparatus a first time;
    displaying at least a portion of a first message in response to pressing the switch the first time;
    selecting the first message to be recorded, when the switch of the camera in not pressed a second time within a predetermined duration from the first time the switch was pressed;
    displaying at least a portion of a second message, when the switch of the camera is pressed a second time within the predetermine duration from the first time the switch was pressed; and
    selecting the second message to be recorded, when the switch of the camera is not pressed a third time within the predetermined duration from the second time the switch was pressed.

23. A method according to claim 22, wherein:
    said steps of displaying each perform a scrolling operation.

24. A method according to claim 22, wherein:
    the steps of displaying terminate the displaying of one of said messages when a function switch is pressed.

25. A method according to claim 24, wherein:
    the steps of displaying terminate the displaying of the message when the function switch, selected from the group consisting of a zoom switch, a self-timer switch, an exposure switch, and a normal/panorama switch, is pressed.

26. A method according to claim 22, wherein:
    the step of displaying the first message scrolls the first message.

27. A method according to claim 22, wherein:
    the step of displaying the first message displays a portion of the first message,
    said method further comprising the steps of:

pressing a message scroll switch; and scrolling the first message after the message scroll switch is pressed.

28. An apparatus for recording and displaying information, comprising:

a lens through which an image is captured;

a memory which stores a message to be recorded which corresponds to the image;

means for calculating a speed at which information is to be displayed to a user, based on a length of the message; and a display which displays the information at the speed which has been calculated.

29. An apparatus according to claim 28, further comprising:

light sensitive film, disposed within the apparatus, for capturing the image and recording the message.

30. An apparatus according to claim 28, wherein:

the means for calculating the speed calculates a scroll speed; and the display scrolls the information on the display at the scroll speed.

31. An apparatus according to claim 30, wherein:

the means for calculating calculates the scroll speed so that a message having a first number of characters results in the speed being faster than when the message has a second number of characters which is less than the first number of characters.

32. An apparatus according to claim 30, wherein:

the means for calculating calculates the scroll speed using a width of the display.

33. An apparatus according to claim 28, wherein:

the means for calculating calculates the speed using a number of characters of the message.

34. An apparatus according to claim 28, wherein:

the display always displays whole characters of the message without scrolling the characters onto or off of the display.

35. An apparatus according to claim 34, wherein:

the display displays whole characters, one at a time.

36. An apparatus according to claim 34, wherein:

the display displays whole characters, two at a time.

37. An apparatus according to claim 28, wherein:

the display displays the information in a constant time period without regard to a length of the information.

38. An apparatus according to claim 28, wherein:

the display displays the information which is said message.

39. An apparatus according to claim 28, further comprising:

means for selecting a message by selecting a first portion of the message from a first group of words and selecting a second portion of the message from a second group of words.

40. An apparatus according to claim 28, wherein:

the display terminates the displaying of the information when a function switch is pressed.

41. An apparatus according to claim 40, wherein:

the display terminates the displaying of the information when the function switch, selected from the group consisting of a zoom switch, a self-timer switch, an exposure switch, and a normal/panorama switch, is pressed.

42. An apparatus for recording and displaying information, comprising:

a lens through which an image is captured;

a memory which stores a message to be recorded which corresponds to the image;

a display which displays a graphical indication that the message has been recorded without displaying the message to the user.

43. An apparatus according to claim 42, wherein:

the display includes a graphical indication having a series of objects.

44. An apparatus according to claim 43, wherein:

the objects of the display are a series of rectangles.

45. An apparatus according to claim 42, wherein:

the display turns on different components of the graphical indication at different times.

46. An apparatus according to claim 42, wherein:

the display displays the graphical indication which includes a plurality of characters which are not related to a content of the message.

47. An apparatus according to claim 46, wherein:

the display displays the graphical indication which includes a plurality of alphabetic characters.

48. An apparatus according to claim 47, wherein:

the display displays the graphical indication which includes alphabetic characters "D A T A".

49. An apparatus for selecting a message to be recorded for a captured image, comprising:

a memory for storing messages;

a display;

a switch for causing a display of one of the messages on the display;

means for determining the switch was pressed a first time and causing the display to display at least a portion of a first message;

means for selecting the first message to be recorded, when the switch of the camera in not pressed a second time within a predetermined duration from the first time the switch was pressed;

means for determining the switch was pressed a second time and causing the display to display at least a portion of a second message; and means for selecting the second message to be recorded, when the switch of the camera is not pressed a third time within the predetermined duration from the second time the switch was pressed.

50. An apparatus according to claim 49, wherein:

said display scrolls each message which is displayed.

51. An apparatus according to claim 49, wherein:

said display terminates the displaying of a message being displayed when a function switch is pressed.

52. An apparatus according to claim 51, wherein:

said function switch is selected from the group consisting of a zoom switch, a self-timer switch, an exposure switch, and a normal/panorama switch.

53. An apparatus according to claim 29, wherein:

said display scrolls the first message.

54. An apparatus according to claim 29, further comprising:

a message scroll switch, wherein:

said display displays a portion of the first message, and said display subsequently scrolls the first message, after the message scroll switch is pressed.

* * * * *

UNITED STATES PATENT AND TRADEMARK OFFICE
CERTIFICATE OF CORRECTION

PATENT NO. : 5,682,563
DATED      : October 28, 1997
INVENTOR(S): Junichi SHINOHARA, et al.

It is certified that error appears in the above-identified patent and that said Letters Patent is hereby corrected as shown below:

On the title page, item [75], the 3rd. and 7th. inventors names' are incorrect. They should be:

--Takashi HONGOH--

--Atsushi SATO--

Signed and Sealed this

Thirtieth Day of December, 1997

Attest:

BRUCE LEHMAN

*Attesting Officer*    *Commissioner of Patents and Trademarks*